(12) United States Patent
Bajic

(10) Patent No.: US 11,705,318 B2
(45) Date of Patent: Jul. 18, 2023

(54) IMPACT IONISATION SPRAY OR ELECTROSPRAY IONISATION ION SOURCE

(71) Applicant: Micromass UK Limited, Wilmslow (GB)

(72) Inventor: Stevan Bajic, Sale (GB)

(73) Assignee: Micromass UK Limited, Wilmslow (GB)

( * ) Notice: Subject to any disclaimer, the term of this patent is extended or adjusted under 35 U.S.C. 154(b) by 0 days.

(21) Appl. No.: 17/055,756

(22) PCT Filed: May 15, 2019

(86) PCT No.: PCT/EP2019/062485
§ 371 (c)(1),
(2) Date: Nov. 16, 2020

(87) PCT Pub. No.: WO2019/219748
PCT Pub. Date: Nov. 21, 2019

(65) Prior Publication Data
US 2021/0210320 A1    Jul. 8, 2021

(30) Foreign Application Priority Data

May 16, 2018 (GB) .................................. 1807914

(51) Int. Cl.
*H01J 49/16*     (2006.01)
*H01J 49/04*     (2006.01)
(Continued)

(52) U.S. Cl.
CPC .......... *H01J 49/045* (2013.01); *G01N 27/622* (2013.01); *G01N 30/7266* (2013.01); *H01J 49/14* (2013.01); *H01J 49/167* (2013.01)

(58) Field of Classification Search
CPC ........ H01J 49/045; H01J 49/14; H01J 49/167; G01N 27/622; G01N 30/7266
See application file for complete search history.

(56) References Cited

U.S. PATENT DOCUMENTS 5,879,949 A * 3/1999 Cole ..................... H01J 49/167
                                                       436/139
6,278,110 B1 * 8/2001 Apffel ................ G01N 30/7253
                                                       250/288
(Continued)

FOREIGN PATENT DOCUMENTS

| GB | 2437844 A | 11/2007 |
| JP | 2012089268 A | 5/2012 |
| WO | 2004051697 A2 | 6/2004 |

OTHER PUBLICATIONS

International Search Report and Written Opinion for International Application No. PCT/EP2019/062485, dated Jul. 23, 2019.
(Continued)

*Primary Examiner* — Wyatt A Stoffa
(74) *Attorney, Agent, or Firm* — Goodwin Procter LLP

(57) ABSTRACT

An impact ionisation spray or electrospray ionisation ion source comprising a nebuliser (30) having a first conduit (11) for providing a liquid sample and a second conduit (10) for providing a nebulisation gas in order to nebulise the liquid sample is disclosed. The first conduit (11) and second conduit (10) are of unitary construction with each other and may be made from glass. The ion source can provide a consistent and/or predictable spray profile for the nebulised sample.

20 Claims, 13 Drawing Sheets

(51) Int. Cl.
*G01N 27/622* (2021.01)
*G01N 30/72* (2006.01)
*H01J 49/14* (2006.01)

(56) References Cited

U.S. PATENT DOCUMENTS

| | | | | |
|---|---|---|---|---|
| 6,337,480 | B1* | 1/2002 | Andrien, Jr. | H01J 49/167 250/281 |
| 6,586,731 | B1* | 7/2003 | Jolliffe | H01J 49/049 250/281 |
| 6,670,607 | B2 | 12/2003 | Wood et al. | |
| 6,863,790 | B1* | 3/2005 | Moini | G01N 27/44717 204/603 |
| 7,442,556 | B2* | 10/2008 | Manger | G01N 1/10 250/281 |
| 7,560,688 | B2* | 7/2009 | Glowers | G01N 27/623 250/281 |
| 7,960,711 | B1* | 6/2011 | Sheehan | H01J 49/165 250/493.1 |
| 8,022,361 | B2* | 9/2011 | Wang | H01J 49/165 239/548 |
| 8,373,116 | B2* | 2/2013 | Oleschuk | H01J 49/167 239/3 |
| 9,117,642 | B2 | 8/2015 | Bajic | |
| 9,502,227 | B2* | 11/2016 | Masujima | G01N 33/48 |
| 9,673,032 | B1* | 6/2017 | Schleifer | H01J 49/045 |
| 10,546,740 | B2* | 1/2020 | Nishiguchi | G01N 27/623 |
| 2002/0179832 | A1* | 12/2002 | Fischer | H01J 49/0431 250/288 |
| 2003/0141392 | A1 | 7/2003 | Nilsson et al. | |
| 2006/0022130 | A1* | 2/2006 | Bousse | H01J 49/165 250/288 |
| 2007/0158543 | A1* | 7/2007 | Glowers | H01J 49/004 250/282 |
| 2007/0221861 | A1* | 9/2007 | Lenke | G01N 27/4473 250/288 |
| 2008/0237459 | A1* | 10/2008 | Hirabayashi | H01J 49/045 250/288 |
| 2009/0230296 | A1* | 9/2009 | Kelly | H01J 49/167 250/281 |
| 2009/0242749 | A1* | 10/2009 | Bajic | H01J 49/167 250/281 |
| 2011/0147576 | A1* | 6/2011 | Wouters | H01J 49/167 250/288 |
| 2012/0043460 | A1* | 2/2012 | Wouters | H01J 49/0404 250/288 |
| 2012/0248303 | A1* | 10/2012 | Hiraoka | H01J 49/0445 250/282 |
| 2013/0140180 | A1* | 6/2013 | Dovichi | G01N 30/7266 204/603 |
| 2014/0014747 | A1* | 1/2014 | Moeller | H01J 49/165 239/690 |
| 2014/0326871 | A1* | 11/2014 | Whitehouse | H01J 49/26 250/288 |
| 2020/0363380 | A1* | 11/2020 | Robson | G01N 30/7266 |

OTHER PUBLICATIONS

Combined Search and Examination Report for GB Application No. GB1807914.5, dated Oct. 31, 2018.
Mavroudakis, L., et al., "Determination of chlorate, perchlorate and bromate anions in water samples by microbore reversed-phase liquid chromatography coupled to sonic-spray ionization mass spectrometry", Rapid Communications in Mass Spectrometry 31:911-918 (2017).
Kanaki, K., and Pergantis, S.A., "Use of 3-nitrobenzonitrile as an additive for improved sensitivity in sonic-spray onization mass spectrometry", Rapid Communications in Mass Spectrometry 28:2661-2669 (2014).
Antonakis, M.M., et al., "Bipolar Mass Spectrometry of Labile Coordination Complexes, Redox Active Inorganic Compounds, and Proteins Using a Glass Nebulizer for Sonic-Spray Ionization", J. Am. Soc. Mass Spectrom. vol. 24 No. 7, 10 pages (2013).
Grafanaki, S., et al., "Coanda Effect Sonic-Sprary Ionization Mass Spectrometry (orthogonal-SSI-MS) for Coupling Conventional and Microbore High Performance Liquid Chromatography to Mass Spectrometry", Environmental Chemical Processes Laboratory, Univ of Crete, Dept of Chemistry ASMS poster (2018).
Mavrakis, E., et al., "Paired-Ion Sonic-Spray Ionization Mass Spectrometry (PI-SSI-MS) for the analysis of anions: Progress towards lower limits of detections", ASMS Poster (2016).
Mavroudakis, L., et al., "Desorption Easy Ambient Sonic-Spray Ionization Mass Spectrometry for Lipidomic Analysis of Cyanobacteria and Green Algae During Growth and Stress Conditions", Dept of Chemistry, Univ Crete PowerPoint presentation, the 66th ASMS Conference on Mass Spectrometery, San Diego, USA, Jun. 4, 2018.
Pergantis, S.A., et al., "Evaluation of Sonic Spray Ionization Mass Proteomics Analysis", Univ Crete, Dept. of Chemistry poster, the 63rd ASMS Conference on Mass Spectrometery, St. Louis, USA, Jun. 1, 2015.
Kanaki, K., et al., "Progress Towards the Development of a Combined Molecular and Atomic Spectrometry System: Sonic-Spray Ionization MS with laser Induced Breakdown Spectroscopy", Univ of Crete, Dept of Chemistry poster, the 31st ASMS Conference on Mass Spectrometery, Minneapolis, USA, Jun. 11, 2013.
Antonakis, M.M., et al., "Evaluating Novel Nebulizer Configurations for Sonic spray Ionization (SSI) Mass Spectrometry", Univ of Crete, Dept of Chemistry ASMS Vancouver poster, the 60th ASMS Conference on Mass Spectrometery, Vancouver, USA, May 23, 2012.

* cited by examiner

Fig. 1A
Prior art
ESI Source
Fig. 1B
Prior art
Impactor spray source
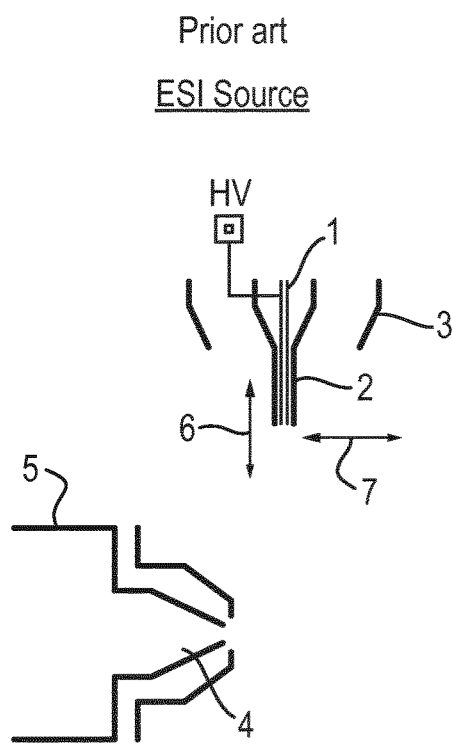
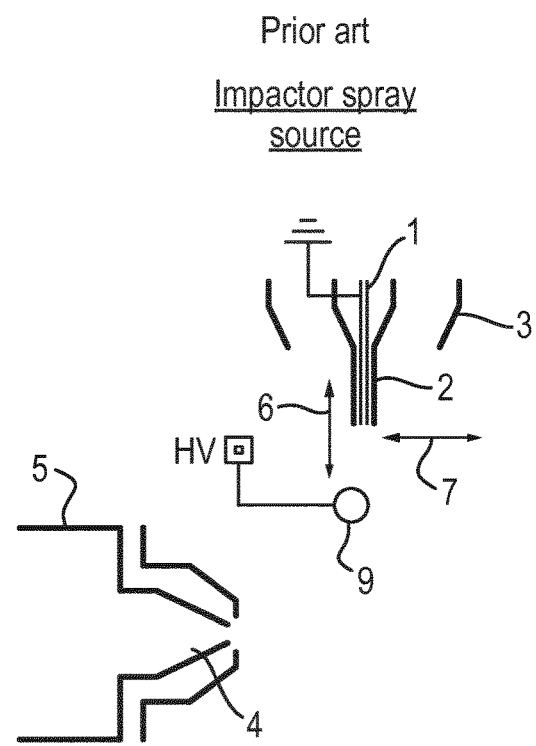
Fig. 1C
Prior art
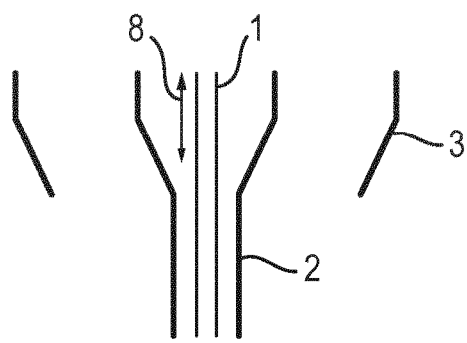

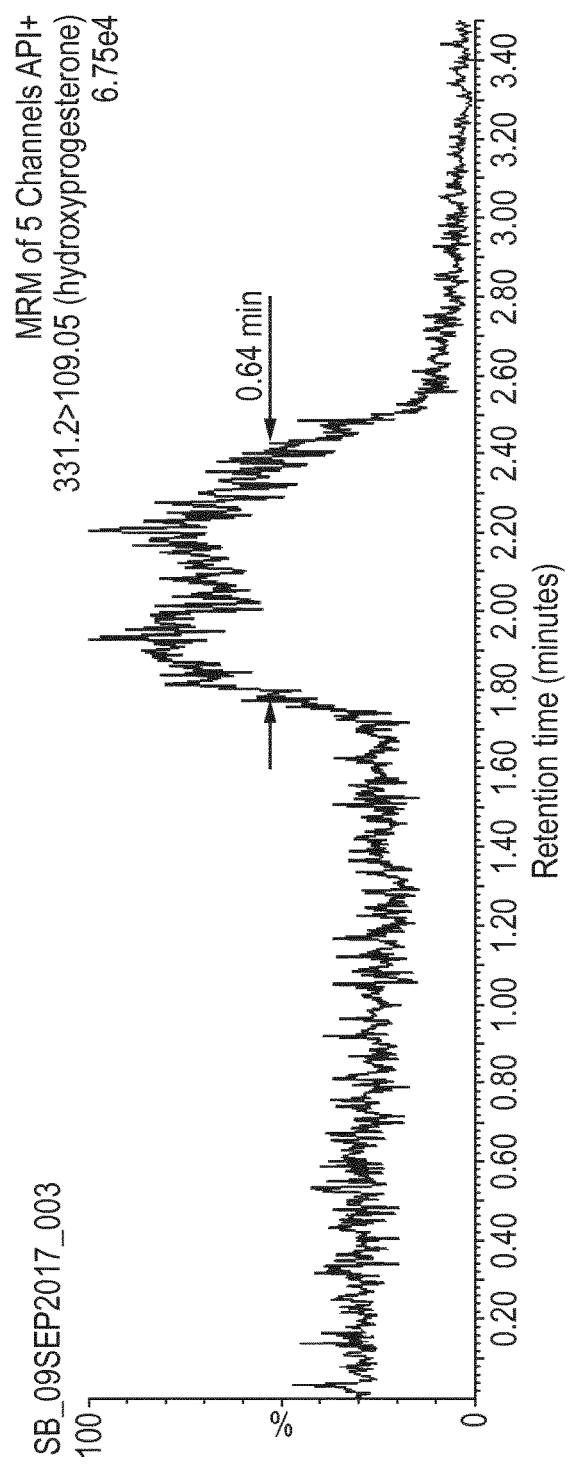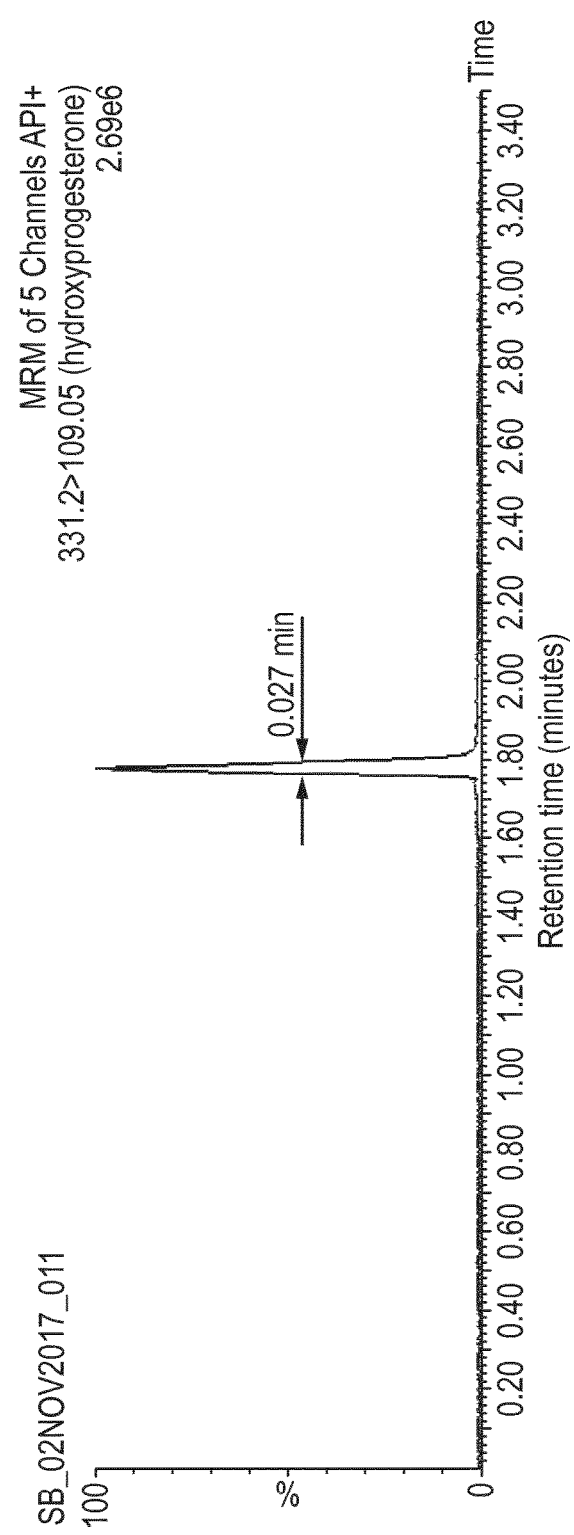

IMPACT IONISATION SPRAY OR ELECTROSPRAY IONISATION ION SOURCE

CROSS-REFERENCE TO RELATED APPLICATIONS

This application is a U.S. national phase filing claiming the benefit of and priority to International Patent Application No. PCT/EP2019/062485, filed on May 15, 2019, which claims priority from and the benefit of United Kingdom patent application No. 1807914.5 filed on May 16, 2018. The entire contents of these applications are incorporated herein by reference.

FIELD OF THE INVENTION

The present invention relates generally to impactor spray (or impact ionisation) or electrospray ionisation ion sources and to mass and/or ion mobility spectrometers comprising impactor spray or electrospray ionisation ion sources.

BACKGROUND

Impactor spray (or impact ionisation) and electrospray ionization (ESI) ion sources can be used, for example, in Liquid Chromatography/Mass Spectrometry (LC/MS) systems. Both types of ion source typically utilize a pneumatic nebulizer to convert the liquid flow from a Liquid Chromatography (LC) column to a charged aerosol. This process typically occurs in an atmospheric pressure, or near-atmospheric pressure, chamber that contains an ion inlet aperture to the mass spectrometry (MS) system and an exhaust outlet to waste. Impactor spray and electrospray ionization are therefore typically used as atmospheric pressure ionization (API) ion sources.

Impactor spray and electrospray ionization ion sources typically utilize a nebulizer that is constructed from an inner conduit that delivers the sample liquid flow and a separate outer conduit that delivers high velocity nitrogen gas to effect nebulization. However, variations in the concentricity and quality of the separate conduit ends can adversely affect the shape and direction of the spray, which can lead to reproducibility issues from one nebulizer to another.

The problem of reproducibility can be addressed to a certain extent by introducing a mechanical adjustment to the inner conduit such that its position with respect to the outer conduit can be protruded or receded (typically by ≤0.5 mm). In addition, these ionization sources may include mechanical adjustment for the vertical and horizontal positioning of the spray with respect to the ion inlet of the mass spectrometer. These mechanical adjustments can be used to improve ion sampling efficiency at various flow rates and generally aid in reducing performance variability from one nebulizer to another. However, these mechanical adjustments can also increase the cost of manufacture and add complexity to the source tuning process. Furthermore, in the case of impactor spray or impact ionisation sources, spray inconsistency can preclude the use of such nebulisers in substantially fixed-geometry sources for low-cost instruments, where source performance may be critically dependent on the point at which the spray strikes an impactor or impact target.

Furthermore, conductive stainless steel tubes are typically used in impactor or impact ionisation spray and electrospray ionization ion sources either in order to prevent a build-up of charge (for impactor spray) or in order to charge the sample (for electrospray). However, stainless steel tubes are not always inert, particularly in the case of biological materials such as intact proteins. In addition, smaller analytes such as peptides can form unwanted iron adducts (Fe+) which can reduce the sensitivity of LC/MS analyses.

Glass nebulisers are routinely used in Inductively Coupled Plasma/Mass Spectrometry (ICP/MS) systems. However, such nebulisers are non-conductive and thus are not used in impactor spray and/or electrospray ionisation ion sources.

It is desired to provide improved impactor spray and/or electrospray ionisation ion sources.

SUMMARY

According to an aspect there is provided an impactor spray (or impact ionisation) or electrospray ionisation ion source comprising:

a nebuliser having a first conduit for providing a liquid sample and a second conduit for providing a nebulisation gas in order to nebulise the liquid sample, wherein the first conduit and second conduit are of unitary construction with each other.

In embodiments, providing a first conduit and a second conduit that are of unitary construction with each other (e.g. providing a unitary or "single-piece" nebuliser body) can avoid the need and/or ability to mechanically adjust the position of the outlet of the first conduit relative to the outlet of the second conduit. Thus, in embodiments, the position of the outlet of the first conduit may remain substantially fixed relative to the outlet of the second conduit. Embodiments can therefore provide a consistent and/or predictable spray profile for the nebulised sample.

For example, in embodiments, the outlets of the first and second conduits may be substantially concentric, and may remain so over time. The spray profile may, therefore, be consistently highly symmetrical. In some embodiments, the outlets of the first conduit and second conduit may be substantially coterminous, and may remain so over time. The spray profile may, therefore, be consistently highly collimated. In other embodiments, the outlet of the first conduit may be recessed or may protrude relative to the second conduit, and the relative positions may remain substantially constant over time. The spray profile may, therefore, be consistently divergent or consistently convergent where that is desired. This consistency and/or predictability is typically not easily achieved with separate metallic conduits which, as discussed above, tend to need mechanical adjustment in order to achieve a desired and/or acceptable performance.

Furthermore, providing a first conduit and a second conduit that are of unitary construction can allow the nebuliser (body) to be manufactured in a manner not typically used when making nebulisers for impactor spray or electrospray ionisation ion sources. For example, in embodiments, the nebuliser may be formed of a blown and/or moulded material (e.g. that is substantially pliable under first atmospheric conditions and then becomes substantially rigid under second atmospheric conditions), such as a glass and/or ceramics and/or plastics or polymer material (e.g. perfluoroalkoxy alkane (PFA)). Such a nebuliser can readily be unitarily formed, e.g. with rigid and/or highly concentric conduits. Again, this can provide a consistent and/or predictable and/or symmetrical spray profile for the nebulised sample. The outlets of the first conduit and second conduit may also, for example, be made to be substantially coterminous by simultaneously grinding, polishing and/or cutting a tip of the nebuliser adjacent the outlet end of the first conduit and second conduit. This is typically not easily achieved with separate metallic tubes, which tend to move, burr or deform undesirably when ground, polished and/or cut.

Furthermore, providing first and second conduits that are of unitary construction can allow the nebuliser (body) to be readily made of materials not typically used for impactor spray or electrospray ionisation ion sources, and these materials may have benefits for particular applications. For example, in embodiments, the nebuliser may be formed of a glass and/or ceramics and/or plastics or polymer material (e.g. PFA). Thus, unusually for impactor spray or electrospray ionisation ion sources, the nebuliser may be formed of a substantially non-metallic and/or substantially non-ferrous and/or substantially (electrically) non-conductive material. It has been identified that this can help to reduce or avoid undesired reaction between the conduits and the sample and/or help to reduce or avoid undesired adduct ions being generated.

The outlet of the first conduit may have a substantially circular cross-sectional profile and/or the outlet of the second conduit may have a substantially circular cross-sectional profile.

The outlet of the second conduit may surround or circumferentially enclose a single (just one) first conduit.

In embodiments, the first conduit may have an inlet for receiving a flow of the liquid sample and/or an outlet for outputting the sample. The sample may exit the nebuliser as a nebulised sample spray (aerosol). The second conduit may have an inlet for receiving a flow of the nebulisation gas and/or an outlet for outputting the nebulisation gas. The first conduit and/or second conduit may be substantially cylindrical. The first conduit and/or second conduit may comprise a tube or capillary. The first conduit and second conduit may be arranged concentrically. The first conduit may be arranged concentrically within the second conduit. The first conduit may be substantially circular in cross-section. The second conduit may be substantially circular or annular in cross-section.

The ion source may further comprise a liner conduit within the first conduit. The liner conduit may be longer than the first conduit. The liner conduit may extend out of the inlet of the first conduit. The liner conduit may not extend out of the outlet of the first conduit. These embodiments can help to couple the ion source to a liquid sample source, such as a chromatography or other separation device, without affecting the spray profile.

The first conduit may have a tapered diameter and/or tapered cross-sectional area. The diameter and/or cross-sectional area of the first conduit may become smaller towards the outlet of the first conduit. This may be a result of the manufacturing (e.g. blowing and/or moulding) process used to make the nebuliser. The liner conduit may have a substantially uniform diameter and/or a more uniform diameter than the first conduit. These embodiments can help to create a more uniform flow path for the sample through the first conduit and/or help to couple the ion source to a liquid sample source, such as a chromatography or other separation device. For example, these embodiments can help to preserve a separation of liquid sample caused by a chromatography or other separation device.

The liner conduit may have a narrower diameter than a diameter of the first conduit. The liner conduit may have a narrower diameter than a diameter of the first conduit along some, the majority or substantially all of the length of the first conduit. The liner conduit may not be of unitary construction with the first and second conduits. The liner conduit may be inserted into the first conduit. The liner conduit may be inserted into the first conduit until it cannot be inserted any further. The liner conduit may be formed of a substantially non-metallic and/or substantially (electrically) non-conductive material. The liner conduit may be formed of a silica-based material, such as fused silica. Alternatively, the liner conduit may be formed of a metallic and/or (electrically) conductive material, e.g. to enable charge to be provided to the liquid sample.

The ion source may further comprise a coupling assembly. The coupling assembly may be provided around the inlet to the first conduit and/or nebuliser of the ion source, e.g. with a press-fit. The coupling assembly may be provided around a liner conduit of the ion source. The coupling assembly may be formed of a plastics or polymer material. The coupling assembly may stabilise the liner conduit relative to the first conduit of the ion source.

The ion source may further comprise one or more connectors for fluidly connecting the ion source to a liquid sample source, such as a chromatography or other separation device. The one or more connectors may comprise one or more Zero Dead Volume (ZDV) connectors. Again, these embodiments can help to create a more uniform flow path for the sample and/or help to couple the ion source to a liquid sample source, such as a chromatography or other separation device. For example, these embodiments can help to preserve a separation of liquid sample caused by a chromatography or other separation device.

The one or more connectors may comprise a connector inlet, e.g. for fluidly connecting to the liquid sample source. The connector inlet may connect to an outlet capillary of the liquid sample source. The outlet capillary of the liquid sample source may have a substantially uniform diameter and/or a more uniform diameter than the first conduit. The inner diameter of the connector inlet may be substantially the same as the outer diameter of the outlet capillary of the liquid sample source. This can allow the capillary of the liquid sample source to be received with a close and/or friction fit within the inlet of the connector.

Similarly, the one or more connectors may comprise a connector outlet, e.g. for fluidly connecting to the ion source. The connector outlet may connect to a liner conduit and/or a coupling assembly of the ion source. The inner diameter of the connector outlet may be substantially the same as the outer diameter of a liner conduit and/or a coupling assembly of the ion source. This can allow the liner conduit and/or the coupling assembly of the ion source to be received with a close and/or friction fit within the outlet of the connector.

The inlet and outlet of the connector may have substantially the same diameter. The outer diameter of the capillary of the liquid sample source may be substantially the same as the outer diameter of the liner conduit and/or the coupling assembly of the ion source. These embodiments can allow the connector to be used either way around.

The connector may comprise a channel that fluidly connects the connector inlet to the connector outlet. The inner diameter of the channel may be less than an inner diameter of the connector inlet and/or connector outlet. The inner diameter of the channel may be substantially the same as the inner diameter of the outlet capillary of the liquid sample source. The inner diameter of the channel may be substantially the same as the inner diameter of the liner conduit of the ionisation device.

The connector may further comprise an inlet retaining assembly, e.g. for retaining a capillary of the liquid sample source relative to the connector. The inlet retaining assembly may comprise a threaded part and/or a resilient (ferrule) part. Threading the threaded part into the connector may compress the resilient part against the connector and the outlet capillary of the liquid sample source, thereby retaining the outlet capillary of the liquid sample source relative to the connector.

The connector may further comprise an outlet retaining assembly for retaining a liner conduit and/or a coupling assembly of the ion source relative to the connector. The outlet retaining assembly may comprise a threaded part and/or a resilient (ferrule) part. Threading the threaded part into the connector may compress the resilient part against the connector and the liner conduit and/or the coupling assembly of the ion source, thereby retaining the liner conduit and/or the coupling assembly of the ion source relative to the connector.

The ion source may further comprise a heated gas conduit. The heated gas conduit may be provided around the nebuliser. The ion source may further comprise a device for providing heated gas to the heated gas conduit to heat the nebulization gas and/or liquid sample, thereby facilitating evaporation of the nebulised sample. The nebulization gas and/or heated gas may comprise nitrogen, argon or helium.

As discussed above, in embodiments, the ion source may comprise an impactor or impact ionisation ion source. In these embodiments, the ion source may further comprise one or more impactor or impact targets at which the outlet of the first conduit and/or second conduit is directed. The nebulised sample spray may impact the one or more impactor targets and the one or more impactor or impact targets may ionise the nebulised sample spray to form ions. The one or more impactor or impact targets may be metallic and/or (electrically) conductive. The one or more impactor targets may be electrically connected to an electrical power supply, for example via a (e.g. current-limiting) resistance. A voltage or electrical potential may be applied to the one or more impactor or impact targets.

In other embodiments, as discussed above, the ion source may comprise an electrospray ionisation ion source. In these embodiments, the ion source may comprise one or more electrodes for providing charge to the sample. The nebulised charged sample spray may then evaporate to form ions. These embodiments can allow charge to be provided to a sample within a non-conductive nebuliser. The one or more electrodes may be electrically connected to an electrical power supply, for example via a (e.g. current-limiting) resistance. A voltage or electrical potential may be applied to the one or more electrodes.

The one or more electrodes for providing charge to the sample may be provided around or within the first conduit and/or second conduit. The one or more electrodes for providing charge to the sample may comprise one or more ring electrodes, e.g. provided around or within the first conduit and/or second conduit. The one or more electrodes for providing charge to the sample may be provided by one or more (electrically) conductive coatings and/or (electrically) conductive treatments, e.g. provided around or within the first conduit and/or second conduit.

The one or more electrodes for providing charge to the sample may also or instead comprise one or more wire electrodes, e.g. provided within the first conduit. The one or more wire electrodes may be provided to the first conduit: through (e.g. a side wall of) an outlet capillary for a liquid sample source; through (e.g. a side wall of) a connector for fluidly connecting the ion source to a liquid sample source; through (e.g. a side wall of) a coupling assembly for coupling the nebuliser to the connector; and/or through (e.g. a side wall of) an liner conduit for the first conduit. The one or more wire electrodes may be provided to the first conduit through a (e.g. side wall) seal. The one or more wire electrodes may also or instead be provided to the first conduit through the inlet or outlet of a connector that connects the ion source to a liquid sample source.

The one or more electrodes for providing charge to the sample may be provided adjacent the outlet of the first conduit and/or second conduit.

The one or more electrodes for providing charge to the sample may also or instead comprise or form part of one or more connectors for fluidly connecting the ion source to a liquid sample source.

In any of the above embodiments, the ion source may also or instead comprise one or more electrodes for removing charge from the nebuliser. These embodiments can allow charge to be removed from a non-conductive nebuliser. The one or more electrodes may be electrically connected to ground.

The one or more electrodes for removing charge from the nebuliser may be provided around the first conduit and/or second conduit. The one or more electrodes for removing charge from the nebuliser may comprise one or more ring electrodes, e.g. provided around the first conduit and/or second conduit. The one or more electrodes for removing charge from the nebuliser may be provided by one or more (electrically) conductive coatings and/or (electrically) conductive treatments, e.g. provided around the first conduit and/or second conduit.

The one or more electrodes for removing charge from the nebuliser may be provided adjacent the outlet of the first conduit and/or second conduit.

In any of the above embodiments, a conductive coating and/or conductive treatment may be applied by dipping or spraying a tip of the nebuliser that is adjacent the output end of the first conduit and/or second conduit. A conductive coating and/or conductive treatment may be applied prior to grinding, polishing and/or cutting the tip of the nebuliser adjacent the outlet end of the first conduit and/or second conduit. The conductive coating and/or conductive treatment may then be substantially removed from the end surface of the tip of the nebuliser adjacent the outlet end of the first conduit and/or second conduit when the tip of the nebuliser adjacent the outlet end of the first conduit and/or second conduit is ground, polished and/or cut. These embodiments can provide a convenient way to reduce or avoid contact between the flow of liquid sample and/or nebulising gas and the conductive coating and/or conductive treatment in situations where such contact is undesirable.

As described above, according to various embodiments the conductive coating may be fully ground back from the end face of the nebuliser tip in order to avoid a short circuit between the conductive coating disposed around the outer surface of the nebuliser towards the tip region and the liquid capillary. However, other embodiments are also contemplated wherein the conductive coating is not fully ground back from or otherwise removed from the end face of the tip of the nebuliser. Instead, according to various embodiments a conductive coating may be applied to the tip region of the nebuliser and then a mask may be applied over the end face of the tip of the nebuliser. A portion of the conductive coating disposed at the exit regions of the first and second conduits may then be removed (for example by etching, polishing or cutting) but the mask may serve to protect a region of the conductive coating disposed on the end face of the tip of the nebuliser. As a result, the conductive coating may be arranged to extend not just around the outer or exterior side surface of the nebuliser towards the tip region of the nebuliser but may also extend on to the end face of the nebuliser tip. Accordingly, according to various embodiments a ring of conductive coating may be arranged to be left on the end face of the tip of the nebuliser and which surrounds the exit regions of the first and second conduits. Embodiments wherein the conductive layer is not fully removed from the end face of the nebuliser tip but wherein the conductive layer also forms a ring pattern on the end face of the nebuliser tip enables a higher electric field to be obtained, in use, at the liquid tip. This is particularly beneficial for electrospray applications and is also beneficial for dissipating static charge in impact ionisation applications.

The ion source may comprise an Atmospheric Pressure Ionisation (API) ion source and/or may be operated at substantially ambient and/or standard atmospheric pressure.

According to another aspect there is provided a mass and/or ion mobility spectrometer comprising an ion source as described herein in any aspect or embodiment.

The spectrometer may comprise an ion inlet. The ion inlet may be located downstream of the ion source (e.g. downstream of the nebuliser outlets and/or downstream of the one or more impactor targets). In use, ions generated by the ion source may be caused to enter the ion inlet of the spectrometer. The ion inlet may comprise an ion orifice, an ion inlet cone, an ion inlet capillary, an ion inlet heated capillary, an ion tunnel, an ion mobility spectrometer or separator, a differential ion mobility spectrometer, a Field Asymmetric Ion Mobility Spectrometer ("FAIMS") device or other ion inlet. The ion inlet device may be maintained at or close to ground potential. The spectrometer may comprise a vacuum chamber for receiving the ions.

The spectrometer may comprise one or more ion guides. One or more ion guides may be maintained at a pressure selected from the group consisting of: (i) <0.0001 mbar; (ii) 0.0001-0.001 mbar; (iii) 0.001-0.01 mbar; (iv) 0.01-0.1 mbar; (v) 0.1-1 mbar; (vi) 1-10 mbar; (vii) 10-100 mbar; (viii) 100-1000 mbar; and (ix) >1000 mbar.

The spectrometer may comprise one or more stacked ring ion guides comprising a plurality of electrodes each having an aperture through which ions are transmitted in use. The spacing of the electrodes may increase along the length of the ion path. The apertures in the electrodes in an upstream section of the ion guide may have a first diameter and the apertures in the electrodes in a downstream section of the ion guide may have a second diameter which is smaller than the first diameter. Opposite phases of an AC or RF voltage or potential may be applied, in use, to successive electrodes.

The spectrometer may comprise a device arranged and adapted to supply an AC or RF voltage or potential to the electrodes. The AC or RF voltage or potential may have an amplitude selected from the group consisting of: (i) <50 V peak to peak; (ii) 50-100 V peak to peak; (iii) 100-150 V peak to peak; (iv) 150-200 V peak to peak; (v) 200-250 V peak to peak; (vi) 250-300 V peak to peak; (vii) 300-350 V peak to peak; (viii) 350-400 V peak to peak; (ix) 400-450 V peak to peak; (x) 450-500 V peak to peak; and (xi) >500 V peak to peak. The AC or RF voltage or potential may have a frequency selected from the group consisting of: (i) <100 kHz; (ii) 100-200 kHz; (iii) 200-300 kHz; (iv) 300-400 kHz; (v) 400-500 kHz; (vi) 0.5-1.0 MHz; (vii) 1.0-1.5 MHz; (viii) 1.5-2.0 MHz; (ix) 2.0-2.5 MHz; (x) 2.5-3.0 MHz; (xi) 3.0-3.5 MHz; (xii) 3.5-4.0 MHz; (xiii) 4.0-4.5 MHz; (xiv) 4.5-5.0 MHz; (xv) 5.0-5.5 MHz; (xvi) 5.5-6.0 MHz; (xvii) 6.0-6.5 MHz; (xviii) 6.5-7.0 MHz; (xix) 7.0-7.5 MHz; (xx) 7.5-8.0 MHz; (xxi) 8.0-8.5 MHz; (xxii) 8.5-9.0 MHz; (xxiii) 9.0-9.5 MHz; (xxiv) 9.5-10.0 MHz; and (xxv) >10.0 MHz.

The spectrometer may comprise one or more ion mobility separation devices and/or one or more Field Asymmetric Ion Mobility Spectrometer devices.

The spectrometer may comprise one or more ion traps or one or more ion trapping regions.

The spectrometer may comprise one or more collision, fragmentation or reaction cells. The one or more collision, fragmentation or reaction cells may be selected from the group consisting of: (i) a Collisional Induced Dissociation ("CID") fragmentation device; (ii) a Surface Induced Dissociation ("SID") fragmentation device; (iii) an Electron Transfer Dissociation ("ETD") fragmentation device; (iv) an Electron Capture Dissociation ("ECD") fragmentation device; (v) an Electron Collision or Impact Dissociation fragmentation device; (vi) a Photo Induced Dissociation ("PID") fragmentation device; (vii) a Laser Induced Dissociation fragmentation device; (viii) an infrared radiation induced dissociation device; (ix) an ultraviolet radiation induced dissociation device; (x) a nozzle-skimmer interface fragmentation device; (xi) an in-source fragmentation device; (xii) an in-source Collision Induced Dissociation fragmentation device; (xiii) a thermal or temperature source fragmentation device; (xiv) an electric field induced fragmentation device; (xv) a magnetic field induced fragmentation device; (xvi) an enzyme digestion or enzyme degradation fragmentation device; (xvii) an ion-ion reaction fragmentation device; (xviii) an ion-molecule reaction fragmentation device; (xix) an ion-atom reaction fragmentation device; (xx) an ion-metastable ion reaction fragmentation device; (xxi) an ion-metastable molecule reaction fragmentation device; (xxii) an ion-metastable atom reaction fragmentation device; (xxiii) an ion-ion reaction device for reacting ions to form adduct or product ions; (xxiv) an ion-molecule reaction device for reacting ions to form adduct or product ions; (xxv) an ion-atom reaction device for reacting ions to form adduct or product ions; (xxvi) an ion-metastable ion reaction device for reacting ions to form adduct or product ions; (xxvii) an ion-metastable molecule reaction device for reacting ions to form adduct or product ions; (xxviii) an ion-metastable atom reaction device for reacting ions to form adduct or product ions; and (xxix) an Electron Ionisation Dissociation ("EID") fragmentation device. The ion-molecule reaction device may be configured to perform ozonolysis for the location of olefinic (double) bonds in lipids.

The spectrometer may comprise a mass analyser. The mass analyser may be selected from the group consisting of: (i) a quadrupole mass analyser; (ii) a 2D or linear quadrupole mass analyser; (iii) a Paul or 3D quadrupole mass analyser; (iv) a Penning trap mass analyser; (v) an ion trap mass analyser; (vi) a magnetic sector mass analyser; (vii) Ion Cyclotron Resonance ("ICR") mass analyser; (viii) a Fourier Transform Ion Cyclotron Resonance ("FTICR") mass analyser; (ix) an electrostatic mass analyser arranged to generate an electrostatic field having a quadro-logarithmic potential distribution; (x) a Fourier Transform electrostatic mass analyser; (xi) a Fourier Transform mass analyser; (xii) a Time of Flight mass analyser; (xiii) an orthogonal acceleration Time of Flight mass analyser; and (xiv) a linear acceleration Time of Flight mass analyser.

The spectrometer may comprise one or more energy analysers or electrostatic energy analysers.

The spectrometer may comprise one or more ion detectors.

The spectrometer may comprise one or more mass filters. The one or more mass filters may be selected from the group consisting of: (i) a quadrupole mass filter; (ii) a 2D or linear quadrupole ion trap; (iii) a Paul or 3D quadrupole ion trap; (iv) a Penning ion trap; (v) an ion trap; (vi) a magnetic sector mass filter; (vii) a Time of Flight mass filter; and (viii) a Wien filter.

The spectrometer may comprise a device or ion gate for pulsing ions; and/or a device for converting a substantially continuous ion beam into a pulsed ion beam.

The spectrometer may be operated in various modes of operation including a mass spectrometry ("MS") mode of operation; a tandem mass spectrometry ("MS/MS or $MS^2$") mode of operation or higher $MS^N$ mode of operation; a mode of operation in which parent or precursor ions are alternatively fragmented or reacted so as to produce fragment or product ions, and not fragmented or reacted or fragmented or reacted to a lesser degree; a Multiple Reaction Monitoring ("MRM") mode of operation; a Data Dependent Analysis ("DDA") mode of operation; a Data Independent Analysis ("DIA") mode of operation a Quantification mode of operation or an Ion Mobility Spectrometry ("IMS") mode of operation. The spectrometer may be operated in a positive and/or negative ion mode of operation.

The spectrometer may comprise a liquid sample source, such as a chromatography or other separation device, upstream of the ion source. The chromatography separation device may comprise a liquid chromatography or gas chromatography device. Alternatively, the separation device may comprise: (i) a Capillary Electrophoresis ("CE") separation device; (ii) a Capillary Electrochromatography ("CEC") separation device; (iii) a substantially rigid ceramic-based multilayer microfluidic substrate ("ceramic tile") separation device; or (iv) a supercritical fluid chromatography separation device.

According to another aspect there is provided a method of impactor spray (or impact ionisation) or electrospray ionisation comprising:

providing a liquid sample through a first conduit of a nebuliser and providing a nebulisation gas through a second conduit of the nebuliser in order to nebulise the liquid sample, wherein the first conduit and second conduit are of unitary construction with each other.

According to another aspect there is provided a method of mass and/or ion mobility spectrometry comprising a method of impactor spray, impact ionisation or electrospray ionisation as described herein in any aspect or embodiment.

According to another aspect there is provided an impactor spray, impact or electrospray ionisation ion source comprising:

a nebuliser having a first conduit for providing a liquid sample and a second conduit for providing a nebulisation gas in order to nebulise the liquid sample, wherein:

the outlets of the first conduit and the second conduit are substantially concentric and have substantially circular cross-sectional profiles at the exit region of the first and second conduits;

the outlet of the second conduit surrounds or circumferentially encloses a single first conduit; and the first conduit and the second conduit are of unitary construction with each other and are formed of glass.

The methods may comprise providing and/or using one or more or all of the features of an ion source and/or mass and/or ion mobility spectrometer as described herein in any aspect or embodiment.

BRIEF DESCRIPTION OF THE DRAWINGS

Various embodiments will now be described, by way of example only, and with reference to the accompanying drawings in which:

FIGS. 1A-1C show typical electrospray and impactor spray ionisation ion sources for use in Liquid Chromatography/Mass Spectrometry (LC/MS) systems;

FIG. 4A shows an LC/MS plot generated when using the ion source of FIG. 2 and FIG. 4B shows an LC/MS plot generated when using the ion source of FIG. 3;

Like reference numerals are used for like elements where appropriate in the drawings.

DETAILED DESCRIPTION

Figure 2:
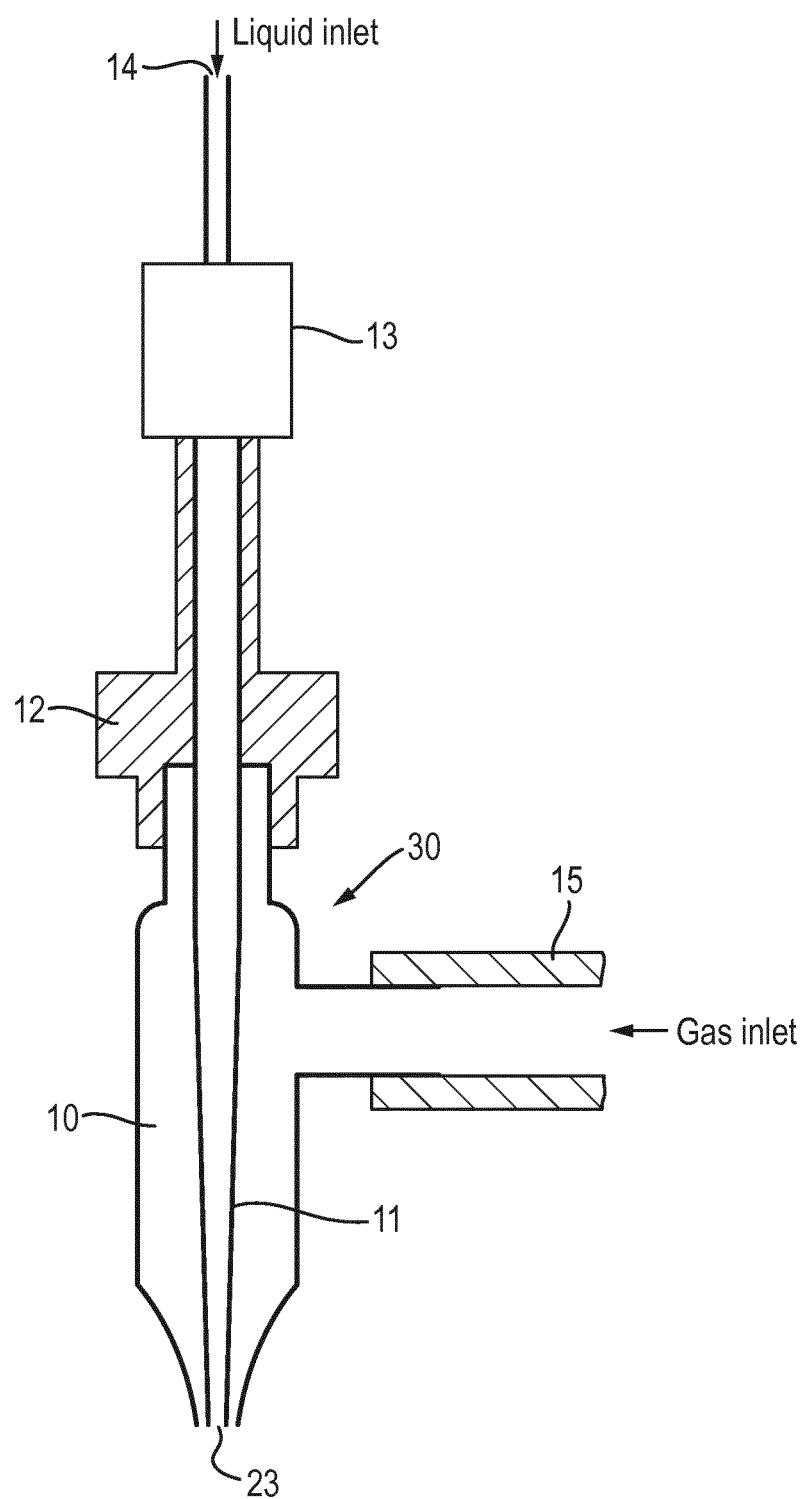
FIG. 2 shows an impactor spray ionisation ion source nebulizer for use in LC/MS systems according to an embodiment.

FIGS. 1A-1C show typical electrospray and impactor spray ionisation ion sources for use in Liquid Chromatography/Mass Spectrometry (LC/MS) systems.

FIG. 1 shows a typical electrospray ionisation ion source. In the electrospray ionisation ion source of FIG. 1, a nebulizer is constructed from an inner liquid conduit 1 and an outer nebulizing gas conduit 2. Both conduits are constructed from stainless steel. In this example, the liquid conduit 1 has an inner diameter of 130 µm and an outer diameter of 230 µm. In this example, the gas conduit 2 has an inner diameter of 330 µm.

In operation, liquid flows into the liquid conduit 1 at a rate that is typically in the range 10 µL/min to 2 mL/min. The gas conduit 2 is pressurized to 100 psi with nitrogen to create a high velocity nebulizer gas flow of typically 200 L/hr. In order to heat the charged droplets of the nebulised sample, a second nitrogen gas flow (1000 L/min) is passed between an annular heater 3 and the gas conduit 2 to create a gas temperature of 150-300° C. in the spray region. For the purpose of charging the resulting nebulised sample, both conduits are held at a potential 0.5-3.0 kV with respect to an ion inlet cone 4 of a mass spectrometer 5.

The ion inlet cone 4 contains an aperture of diameter 0.8 mm at its apex which serves as an interface between the atmospheric pressure region of the source enclosure and a first vacuum region of the mass spectrometer 5. In order to increase the ion current that enters the ion inlet cone 4, the nebulizer of FIG. 1A is mechanically adjustable in the vertical direction 6 and horizontal direction 7.

FIG. 1B then shows a typical impactor spray or impact ionisation ion source. The impactor spray or impact ionisation ion source of FIG. 1B shares many features with the electrospray ionisation ion source of FIG. 1A, such as the liquid conduit 1, gas conduit 2, annular heater 3, and mechanical adjustability in the vertical direction 6 and horizontal direction 7. However, rather than the nebuliser being held at a potential of 0.5-3.0 kV with respect to the ion inlet cone 4 of the mass spectrometer 5, the ion source of FIG. 1B comprises a grounded nebulizer that directs nebulised sample to impact on a cylindrical metal impactor target 9. The target 9 in this example comprises a polished stainless steel rod with a diameter of 1.6 mm. The target 9 may be held at a potential of 0.5-3.0 kV with respect to the nebulizer and the ion inlet cone 4 of the mass spectrometer 5. Again, in order to increase the ion current that enters the ion inlet cone 4, the nebulizer of FIG. 1B is mechanically adjustable in the vertical direction 6 and horizontal direction 7.

FIG. 1C also shows that the liquid conduit 1 of the ion sources of both FIG. 1A and FIG. 1B can be adjusted 8 with respect to the gas conduit 2 to improve the ion current and correct for non-uniformity in the spray profile.

Figure 5:
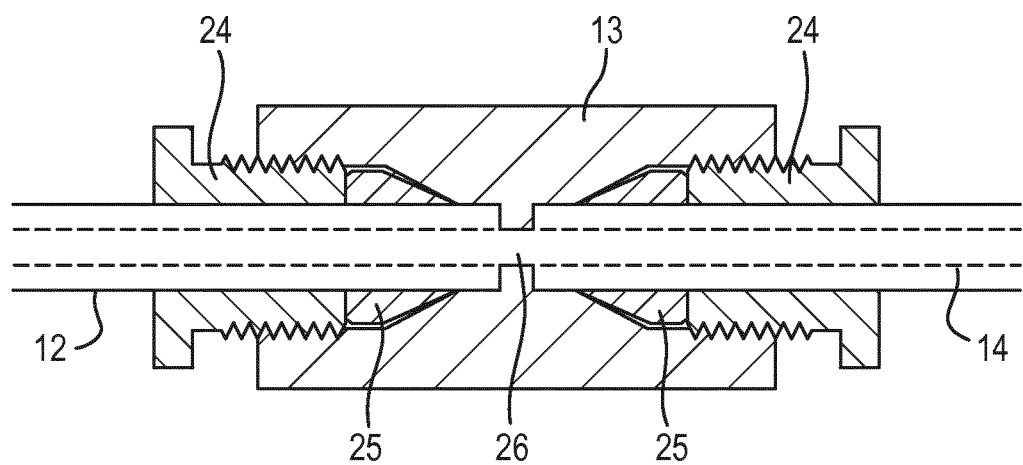
FIG. 5 shows a Zero Dead Volume (ZDV) connector for the ion source of FIG. 3.

However, the mechanical adjustments in these typical ion sources can increase the cost of manufacture and add complexity to the source tuning process. Indeed, it has been found that the impactor spray or impact ionisation ion source of FIG. 1B is far more sensitive to the shape and position of the nebulised sample sprayed from the nebulizer than the electrospray ionisation ion source of FIG. 1A. Thus, the ion source of FIG. 1B makes critical use of the vertical 6, horizontal 7 and conduit 8 adjustments. Indeed, spray inconsistency can preclude the use of such nebulisers in impactor spray sources, particularly in low-cost (fixed geometry) instruments where ion source performance may be critically dependent on the point at which the spray strikes the impactor target.

FIG. 2 shows an impactor spray or impact ionisation ion source nebulizer 30 for use in LC/MS systems according to an embodiment. In this embodiment, the main body of the nebulizer 30 is a single-piece glass assembly comprising a tapered liquid conduit 11 and an outer nebulizer gas conduit 10. The liquid conduit 11 and gas conduit 10 are of unitary construction. A concentric tip 23 of the nebulizer 30 is ground/polished flat, such that the outputs of the liquid conduit 11 and gas conduit 10 are coterminous (flush) and highly concentric. The nebulizer 30 can therefore provide a consistent, predictable, symmetrical and highly collimated spray of nebulised sample. In some embodiments, prior to grinding the tip 23 of the nebulizer 30, the outlet of the liquid conduit 11 and gas conduit 10 may be closed (e.g. as a result of the manufacturing process) and the process of grinding the tip 23 may also open the outlets. In other embodiments, the liquid conduit 11 may be recessed or protrude relative to the gas conduit 10, for example so as to provide a consistently convergent or divergent spray profile.

In use, gases such as nitrogen, argon or helium can be made to enter the gas conduit 10 via a gas inlet 15. The gas may have an applied pressure (e.g. 50 psi) that gives rise to a high velocity gas jet (e.g. with a flow rate 70 L/hr). Liquid sample enters the liquid conduit 11 via a single-piece plastic connector assembly 12 that is press-fitted onto the inlet end of the liquid conduit 11. The tube section of the connector assembly 12 may have an internal diameter (e.g. 500 μm) which is the same as the inlet diameter of the liquid conduit 11.

For Liquid Chromatography/Mass Spectrometry (LC/MS) applications, the nebulizer 30 is connected to a LC outlet capillary 14 from the LC column of the LC separation device. The LC outlet capillary 14 may have an internal diameter of 100 μm. In this embodiment, this connection is made using a zero dead-volume (ZDV) connector 13.

Although the unitary nebulizer 30 shown in FIG. 2 can be adequately used in some embodiments, the nebulizer 30 may not perform adequately in other embodiments, such as some LC/MS experiments. This is because of the large dead-volume that can arise between the LC outlet capillary 14 on the one hand and the connector assembly 12 and liquid conduit 11 on the other hand. For example, chromatographic peaks that elute from the LC column may travel along an LC outlet capillary 14 with an internal diameter of 100 μm before entering a connector assembly 12 and liquid conduit 11 that have internal diameters of 500 μm. This increase in volume can lead to peak broadening and dilution of the sample concentration that may severely affect the sensitivity of peak detection.

To illustrate this detrimental effect, FIG. 4A shows a resulting LC/MS peak obtained for an injection of 1 pg of α-hydroxyprogesterone onto a 2.1 mm×50 mm Ultra Performance Liquid Chromatography (UPLC) column at a flow rate of 0.4 mL/min whilst using an impactor spray source that contained a unitary nebulizer 30 as shown in the embodiment of FIG. 2. The peak shown in FIG. 4A displays a low signal-to-noise ratio and a wide peak width at half maximum that is approximately 20% of the total chromatographic run time of 3.5 minutes.

In order to correct for the potential problems that arise from excessive nebulizer dead-volume, FIG. 3 shows an alternative embodiment of a nebulizer 30 wherein a polyimide-coated fused silica liner conduit 16 is fitted between the ZDV connector 13 and the outlet end of the liquid conduit 11. In this embodiment, the liner conduit 16 has an outside diameter of 190 μm and an inside diameter of 75 μm. The liner conduit 16 is inserted into the liquid conduit 11 until it can move no further.

The end of the liner conduit 16 that protrudes from the connector assembly 12 is then cut flush with the inlet to the connector assembly 12 and the flush ends are fitted into the ZDV connector 13. A ferrule in the ZDV connector 13 is then used to compress the connector assembly 12 onto the liner conduit 16 to form a seal. This arrangement reduces the internal dead-volume of the nebulizer 30 to make it more compatible with LC/MS analysis.

FIG. 4B shows the LC/MS peak obtained from the same experiment described for FIG. 4A, but where the nebulizer 30 was modified according to the embodiment of FIG. 3. FIG. 4B shows that the detected peak for α-hydroxyprogesterone has a greater signal-to-noise ratio and a peak width at half maximum that is 24 times narrower than the peak width obtained from the nebulizer 30 of FIG. 2.

FIG. 5 shows a Zero Dead Volume (ZDV) connector that can be used in embodiments. In the embodiment of FIG. 3, for example, ZDV connector 13 comprises an internal channel 26 that connects the bores of the liner conduit 16 and LC outlet conduit 14. In this case, the connector assembly 12 is inserted into one side of the connector 13 until it abuts the channel 26. A first threaded part 24 is then tightened so that a first pliable ferrule part 25 swages onto the connector assembly 12 and liner conduit 16 to secure them to the body of the connector 13. For clarity, the liner 16 is omitted from FIG. 5. Similarly, LC outlet capillary 14 is inserted from the opposite side of the connector 13 until it abuts the channel 26. A second threaded part is then tightened so that a second pliable ferrule part 25 swages onto the LC outlet capillary 14 to secure it to the body of the connector 13. In this case, liquid sample entering from the LC outlet capillary 14 can only pass through the channel 26 and exit via the liner conduit 16, which is trapped within the connector assembly 12.

Figure 3:
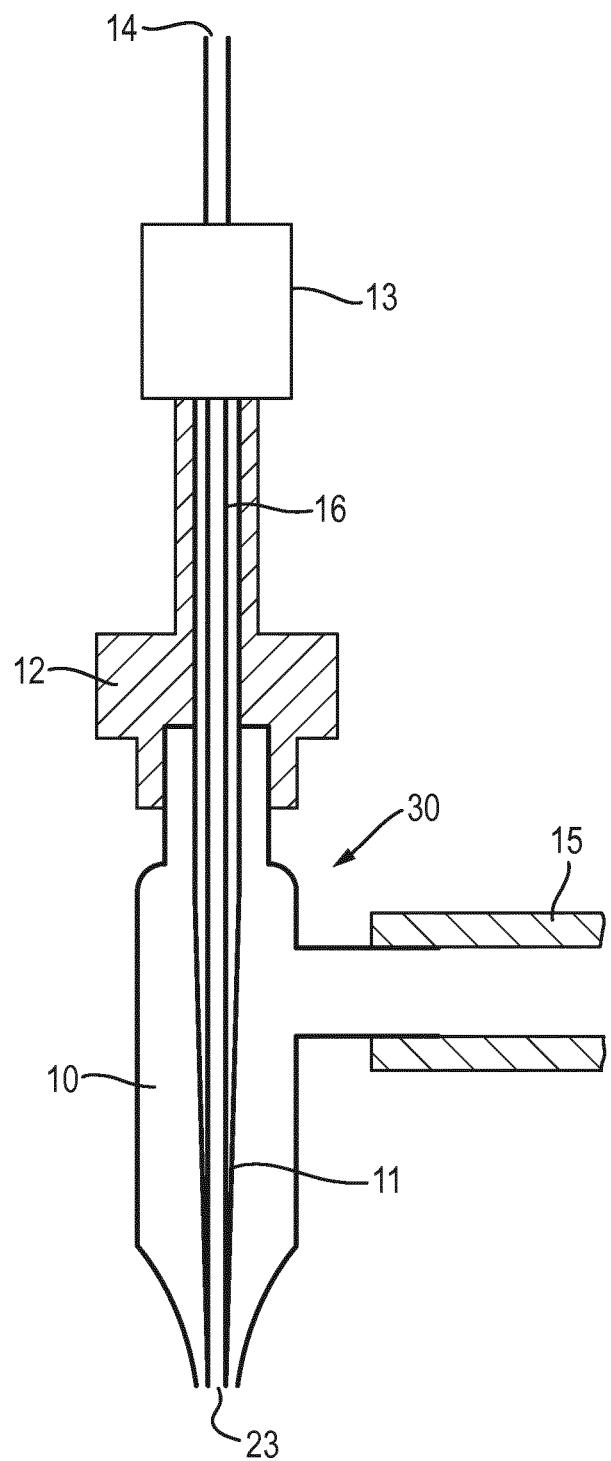
FIG. 3 shows an impactor spray ionisation ion source nebulizer for use in LC/MS systems according to another embodiment.

Although the nebulizers 30 shown in FIGS. 2 and 3 can function in an impactor spray or impact ionization source, the insulating glass nebulizer bodies 30 may be prone to electrical charging in the presence of high electric fields or continuous ion currents. If this charge is not dissipated, it may adversely affect the performance and stability of the ionization source.

Figure 6:
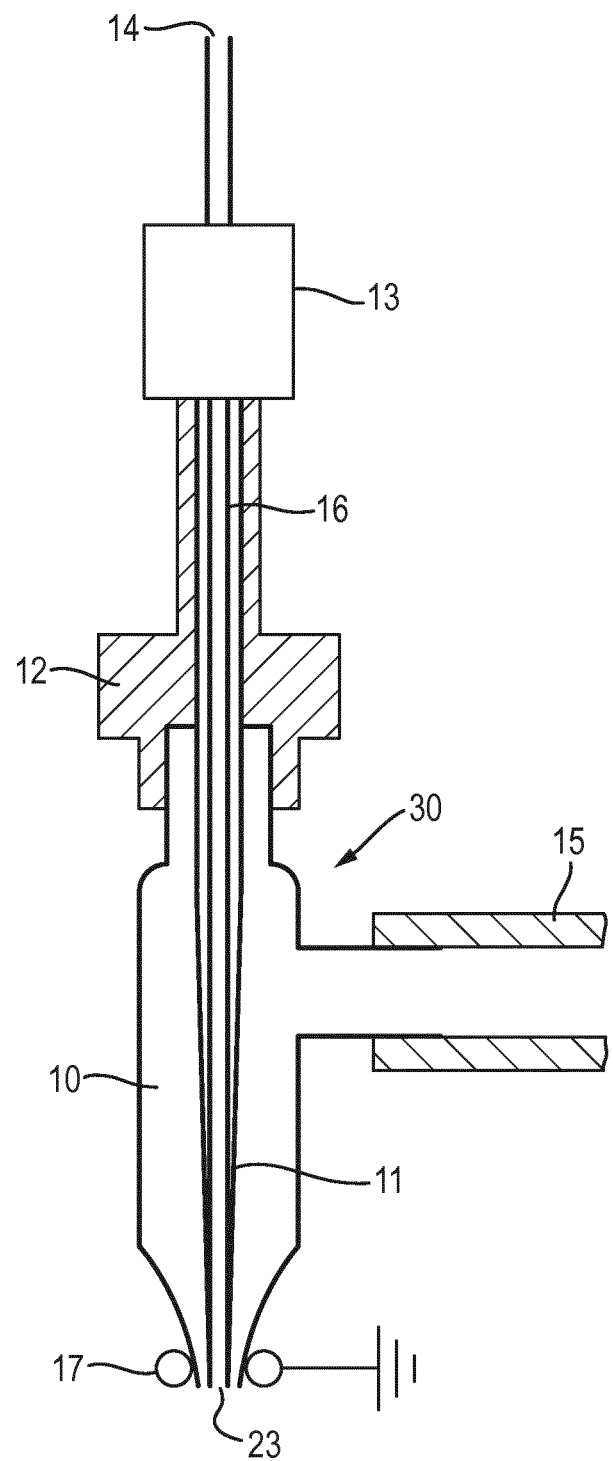
FIG. 6 shows an impactor spray ionisation ion source nebulizer for use in LC/MS arrangements according to yet another embodiment.

Accordingly, FIG. 6 shows an impactor spray or impact ionisation ion source nebulizer 30 for use in LC/MS arrangements according to another embodiment. In FIG. 6, the external side surface of the nebuliser gas conduit 10 in the region of the tip 23 supports a grounded conducting ring electrode 17 that can dissipate surface charge in this region. In other embodiments, a conducting coating electrode may also or instead be applied to the external side surface of the nebuliser gas conduit 10 in the region of the tip 23. For example, a conducting silver paint may be used to coat the external side surface of the nebulizer 30 and a tinned copper wire may be embedded into this coating. The wire can then be grounded. In other embodiments, a tin oxide treatment may be used that infuses a conducting layer electrode into the surface of the glass.

In embodiments in which a conductive coating or treatment is applied in the region of the tip 23, the tip 23 of the nebuliser 30 may be coated or treated by dipping or spraying. As discussed above, the tip 23 can then be subjected to grinding so that the outlets of the liquid conduit 11 and gas conduit 10 become coterminous (flush). During this process, the coating or treated surface may be substantially removed from the end surface or surfaces at the tip 23 of the nebuliser 30 such that only the external side surface of the nebuliser 30 remains conductive. These embodiments can provide a convenient way to reduce or avoid undesirable direct contact between the liquid sample and the conductive coating or treatment in the region of the tip 23.

Other embodiments are also contemplated wherein the conductive coating or treatment is not fully ground back from or otherwise removed from the end face of the tip 23 of the nebuliser 30. Instead, according to various embodiments a conductive coating or treatment may be applied to the tip region 23 of the nebuliser 30 and then a mask may be applied over the end face of the tip 23 of the nebuliser 30. A portion of the conductive coating or treatment disposed at the exit regions of the first gas conduit 10 and the second liquid conduit 11 may then be removed (for example by etching, polishing or cutting) but the mask may serve to protect a region of the conductive coating or treatment disposed on the end face of the tip 23 of the nebuliser 30. As a result, the conductive coating or treatment may be arranged to extend not just around the outer or external side surface of the nebuliser 30 towards the tip region 23 of the nebuliser 30 but may also extend on to the end face of the nebuliser tip 23. Accordingly, according to various embodiments a ring of conductive coating or treatment may be arranged to be left or otherwise remain on the end face of the tip 23 of the nebuliser 30 and which surrounds the exit regions of the first gas conduit 10 and the second liquid conduit 11. Embodiments wherein the conductive layer or treatment is not fully removed from the end face of the nebuliser tip 23 but wherein the conductive layer or treatment also forms a ring pattern on the end face of the nebuliser tip 23 enables a higher electric field to be obtained, in use, at the liquid tip. This is particularly beneficial for electrospray applications and is also beneficial for dissipating static charge in impact ionisation applications.

The embodiment of FIG. 6 was tested with a LC/MS method on five analytes and has been shown to stabilize the performance of an impactor spray source. In this testing, a test solution (95% water, 5% acetonitrile and 0.1% formic acid) was prepared that contained the following analytes (and concentrations): acetaminophen (200 fg/μL), sulphadimethoxine (100 fg/μL), caffeine (200 fg/μL), α-hydroxyprogesterone (5 pg/μL) and verapamil (50 fg/μL). Mobile phase A was ELGA purified water with 0.01% formic acid and 0.05% ammonia solution. Mobile phase B was acetonitrile with 0.01% formic acid and 0.05% ammonia solution. 10 μl of the test solution was injected onto a UPLC column (C18, 2.1 mm×50 mm, 1.7 μm particles) at a flow rate of 0.4 mL/min and analytes were eluted using a reverse phase gradient over a chromatographic run time of 3.5 minutes. The UPLC system was connected to a high sensitivity triple quadrupole mass spectrometer that was operated in multiple reaction monitoring (MRM) mode with one MRM transition per analyte. Three different ionization source types were tested: a standard ESI source, a standard impactor spray source and an impactor spray source with a nebulizer 30 according to an embodiment as shown in FIG. 6. The ESI and standard impactor spray sources were tuned on an α-hydroxyprogesterone tuning solution using the vertical 6, horizontal 7 and conduit 8 adjustments shown in FIG. 1. The impactor spray source as shown in FIG. 6 was tuned using the same solution but with horizontal 7 adjustment only. All three ionization sources produced LC/MS peaks with comparable peak widths at half maximum.

Figure 7:
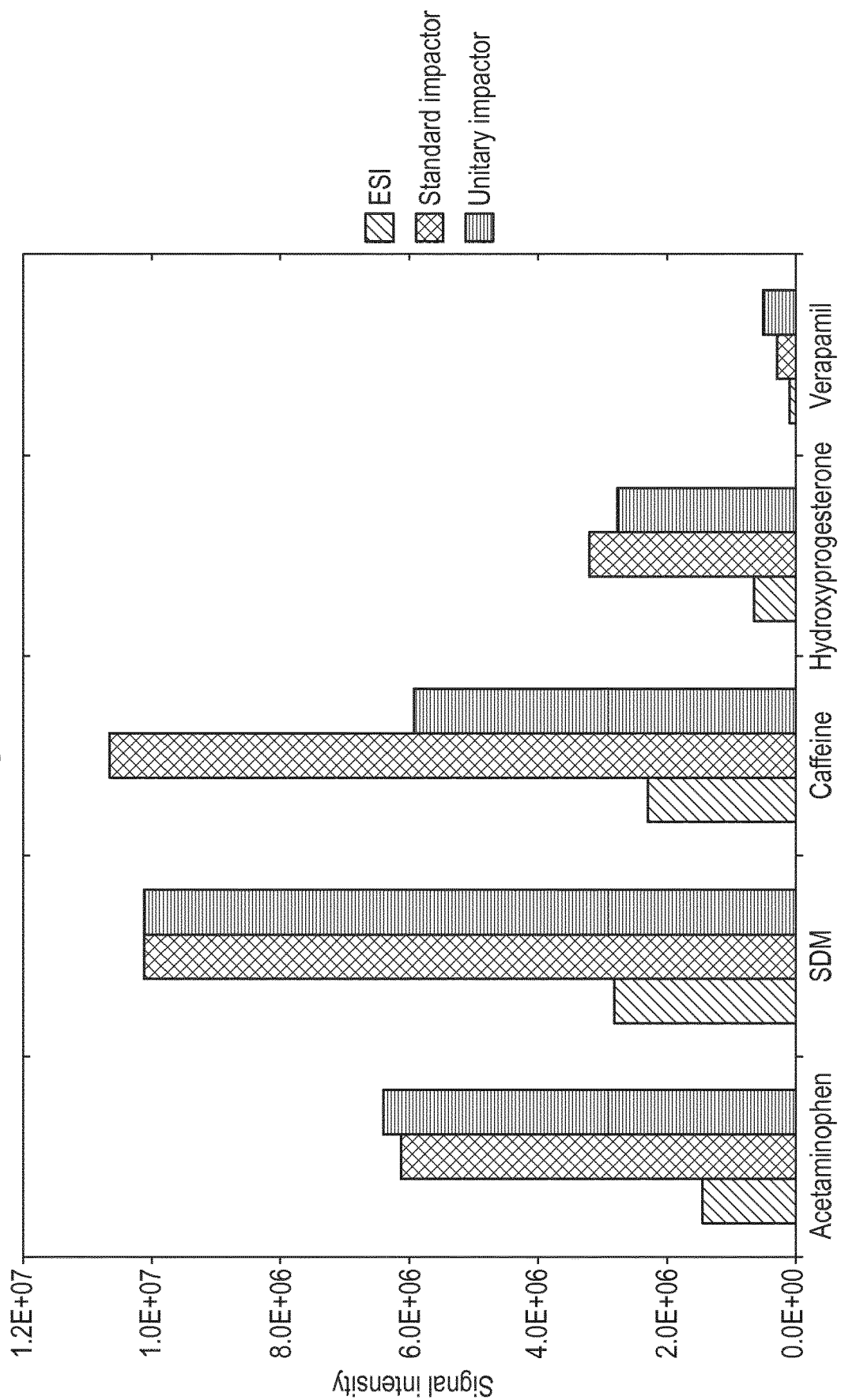
FIG. 7 shows a comparison of the signal intensity obtained with the impactor spray ion source of FIG. 6 versus the signal intensity obtained with typical electrospray and impactor spray ion sources.

FIG. 7 summarizes the chromatographic peak heights (signal intensity) obtained for each analyte and each ionization source type. Each column in FIG. 7 is an average of three repeat on-column injections. A comparison of the ESI and standard impactor data shows that the impactor spray technique typically gives 3 to 4 times more ion signal under these conditions for all analytes. A comparison of the standard impactor and impactor spray source as shown in FIG. 6 shows that the sources are comparable in performance, where the latter gives lower ion signals for caffeine but higher ion signals for verapamil. This indicates that the impactor spray or impact ionisation source according to an embodiment as shown in FIG. 6 is viable for use as a low-cost substantially fixed geometry impactor spray or impact ionisation source.

It has been shown that the use of helium as a nebulizer gas can give sensitivity enhancements over nitrogen in some embodiments. For example, this was observed using an impactor spray source with an ungrounded nebulizer 30 as shown in FIG. 3. In this case, the helium inlet was set to a pressure of 60 psi. The enhanced performance with helium is thought to be related to some charging in both the atmospheric source region and on the RF lens of the first vacuum region of the mass spectrometer.

However, it has also been shown that the use of nitrogen as a nebulizer gas can give sensitivity enhancements over helium in other embodiments. For example, this was observed using an impactor spray source with a grounded nebulizer as shown in FIG. 6. In this case, all 5 test analytes described above had approximately two times the ion signal with nitrogen as opposed to helium.

In any of the above impactor spray embodiments, the nebulised spray may be directed so as to impact on a target 9 in order to form ions, for example in a similar manner to that which is described above with reference to FIG. 1B.

Although impactor spray sources can produce greater ionization efficiency than electrospray ionisation ion sources for a wide range of analytes, electrospray is still generally regarded as a preferred ionization method for biomolecules, particularly at low flow rates (<10 µL/min). The nebuliser described above can accordingly be modified for use in an electrospray ionisation source in other embodiments.

Figure 8:
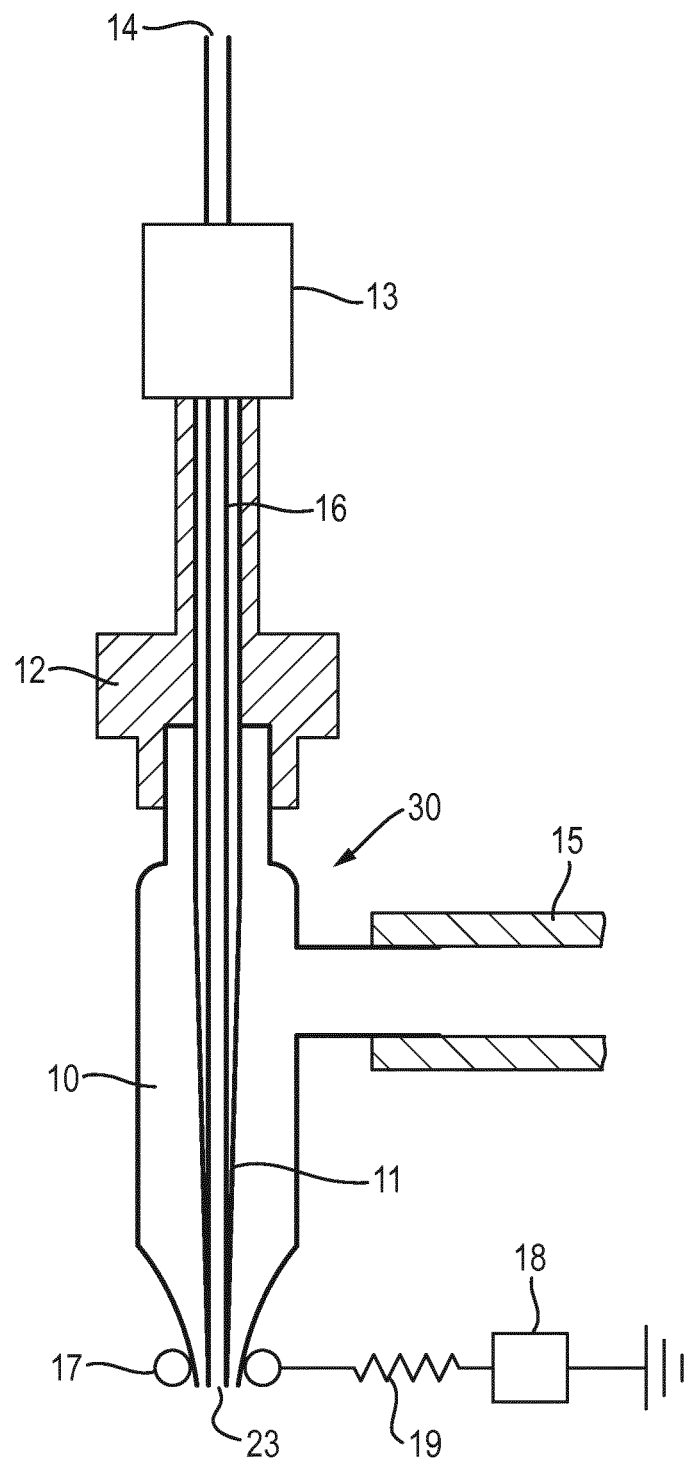
FIG. 8 shows an electrospray ionisation ion source for use in LC/MS arrangements according to an embodiment.

FIG. 8 shows an electrospray ionisation ion source for use in LC/MS systems according to an embodiment. In the embodiment of FIG. 8, the ion source again comprises a conducting ring electrode 17 in the region of the tip 23 of the nebuliser 30. However, a voltage or potential is applied to the ring electrode 17 with respect to the mass spectrometer, rather than the ring electrode 17 being held at ground. In this embodiment, the voltage or potential is applied from an electrical power supply 18 via a current-limiting resistor 19. The resistor may typically have a resistance in the range 1-10 MΩ.

The embodiment shown in FIG. 8 is an example of an induction electrospray ionisation source where the liquid sample does not make contact with the conducting ring electrode 17. As such, a negative voltage or potential may be applied to the ring electrode 17 with respect to the mass spectrometer 5 in order to create predominantly positively charged droplets and ions. In contrast to this, the electrospray ionisation ion source of FIG. 1A has a liquid conduit 1 that is in direct contact with the liquid sample and thus has a positive voltage or potential applied with respect to the mass spectrometer 5 in order to produce positively charged droplets and ions. An advantage of the induction electrospray ionisation source as shown in FIG. 8, is that it is compatible with capillary electrophoresis (CE) and ceramic tile chromatography devices that typically require the liquid pathway to be held nominally at ground potential.

According to another embodiment a further electrospray embodiment is contemplated wherein instead of applying a negative potential to the ring electrode as with the embodiment shown and described with reference to FIG. 8 above, instead a high positive potential (which may, for example, be ≥4 kV) may applied to the ring electrode 17. The application of a high positive voltage to the ring electrode 17 results in the generation of positive ions or positively charged droplets which emerge from the outlet of the liquid conduit 11. Inspection of the tip region reveals that the ionisation occurs due a visible discharge between the liquid capillary 11 and the ring electrode 17.

The induction electrospray ionisation source of FIG. 8 was tested using the same five analytes and UPLC/MS method described above.

Figure 9:
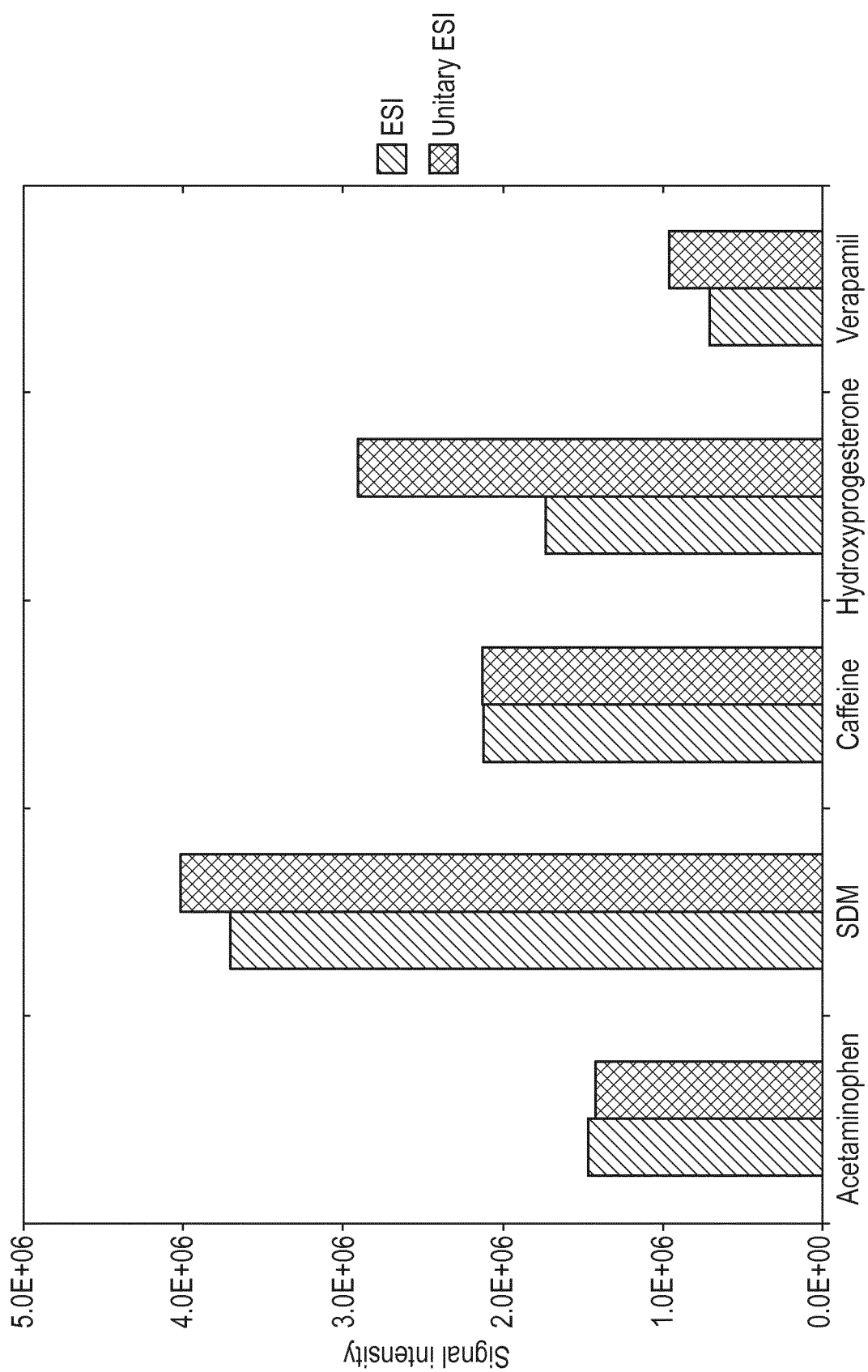
FIG. 9 shows a comparison of the signal intensity obtained with the electrospray ionisation ion source of FIG. 8 versus the signal intensity obtained with a typical electrospray ion source.

FIG. 9 summarizes the chromatographic peak heights (signal intensity) obtained for each analyte with a standard electrospray ionisation source and the electrospray ionisation source of FIG. 8. The standard electrospray ionisation source and the electrospray ionisation source of FIG. 8 were biased to +0.5 kV and −1.0 kV, respectively. Each column is an average of three repeat on-column injections. Although similar in sensitivity, the electrospray ionisation source of FIG. 8 produced greater ion signals, particularly for α-hydroxyprogesterone and verapamil. This again indicates that the electrospray ionisation source as shown in FIG. 8 is viable for use as a low-cost substantially fixed geometry electrospray ionisation source.

Whilst the induction-type electrospray ionisation source as shown in FIG. 8 can be used to ionize many common analytes, there are some chemical compounds that are typically ionized by direct electrolytic reactions at the surface of a biasing electrode.

Figure 10:
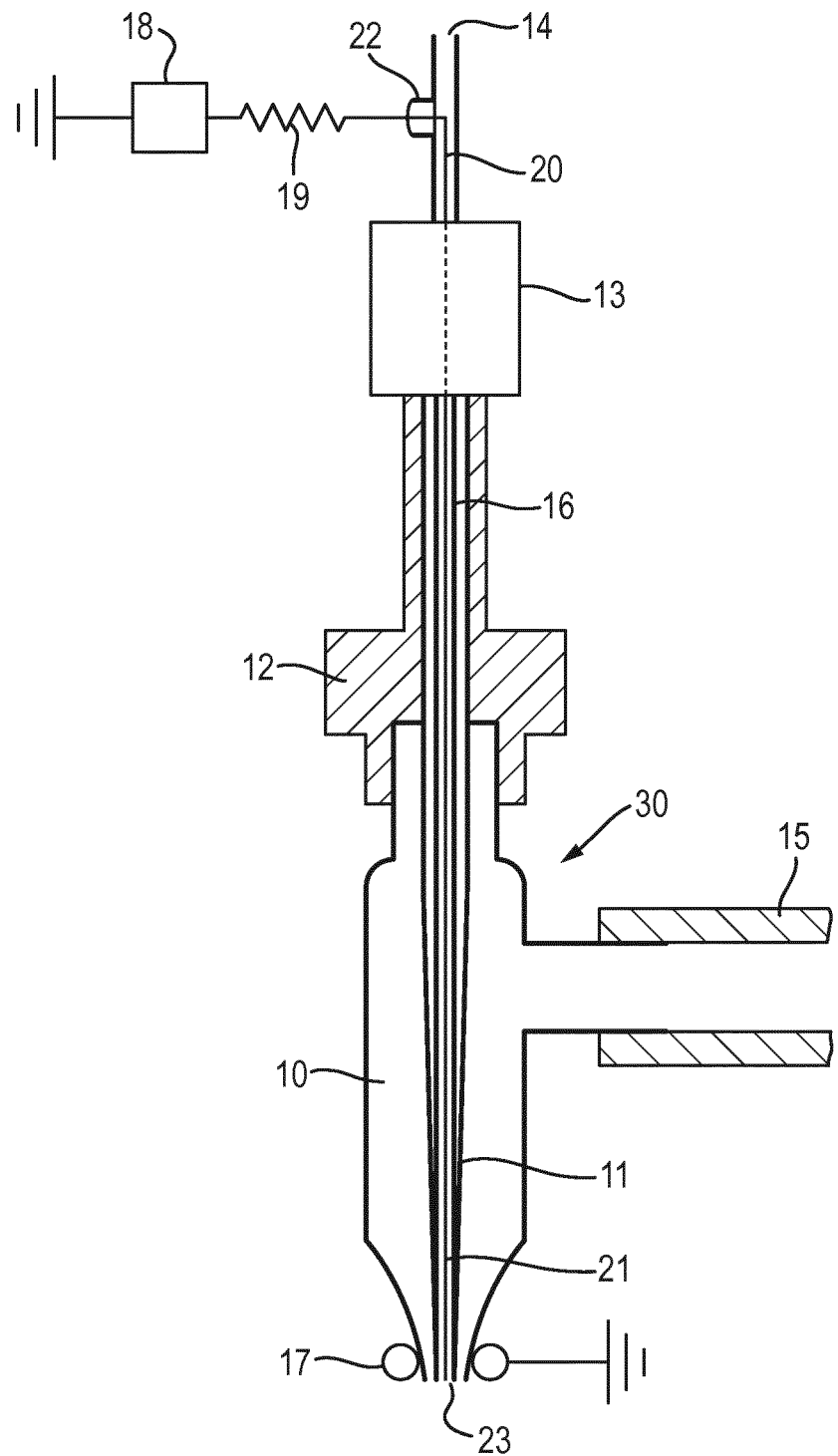
FIG. 10 shows an electrospray ionisation ion source for use in LC/MS systems according to another embodiment.

FIG. 10 accordingly shows an electrospray ionisation ion source for use in LC/MS systems according to another embodiment. In this embodiment, the conducting ring electrode 17 is grounded and a fine metallic wire electrode 20 (which may be 25 µm in diameter) is passed down inside the liner conduit 16. The wire tip 21 of the wire electrode 20 terminates close to the grounded ring electrode 17 adjacent to the tip 23 of the nebuliser 30. A positive voltage or potential is then supplied to the wire electrode 20 via an electrical power supply 18 via a current-limiting resistor 19 in order to produce positively charged droplets and ions. In embodiments, metallic wires of various compositions could be used such that the work function of the wire electrode 20 is best suited to the ionization potentials of the analytes and solvents that are used.

In this embodiment, the wire electrode 20 passes through the side wall of the LC outlet capillary 14 via a side wall seal 22. In other embodiments, so as to avoid the need for a side wall seal 22, the wire electrode 20 may be passed through the ZDV connector 13 or a second ZDV fitting (upstream of the first ZDV fitting 13). In these embodiments, the wire electrode 20 may extend along the outside of a compression ferrule and emerge outside of the ZDV fitting. The pliability of the ferrule and the fine dimensions of the wire electrode 20 make such an embodiment a possibility. An electrical potential can then be applied to the exposed section of the wire electrode 20.

Figure 11:
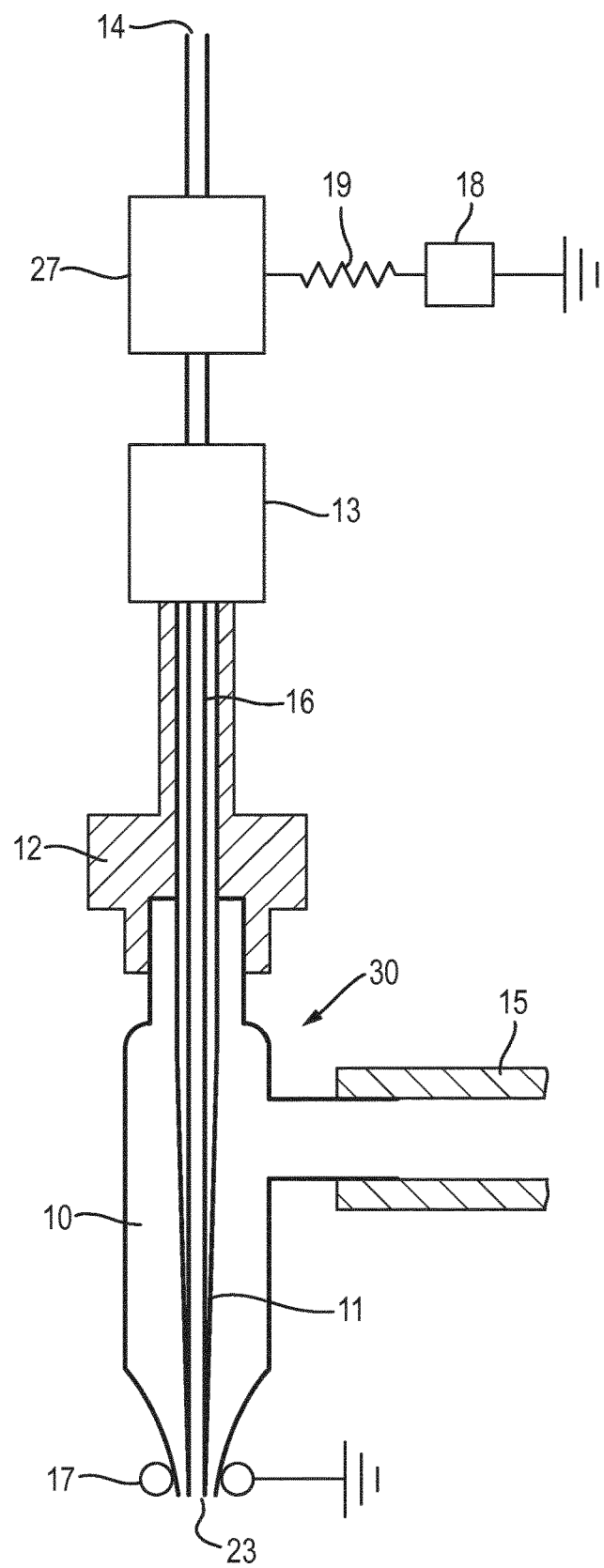
FIG. 11 shows an electrospray ionisation ion source for use in LC/MS systems according to yet another embodiment.

FIG. 11 shows an electrospray ionisation ion source for use in LC/MS systems according to yet another embodiment. In this embodiment, a potential is applied to the liquid sample through a metallic ZDV connector 27 which is connected to a power supply 18 via a current-limiting resistor 19. The liquid sample makes contact with the inner surface of the metallic ZDV fitting 27 and is hence charged.

In any of the above impactor spray, impact ionisation or electrospray ionisation embodiments, the ion source may be operated as an API ionisation source. The ion source may be heated by an annular heater 3, for example in a similar manner to that which is described above with reference to FIGS. 1A-1B. The ion source may be arranged such that ions enter a vacuum chamber of a mass spectrometer 5 via an inlet cone 4, for example in a similar manner to that which is described above with reference to FIGS. 1A-1B.

Figure 12:
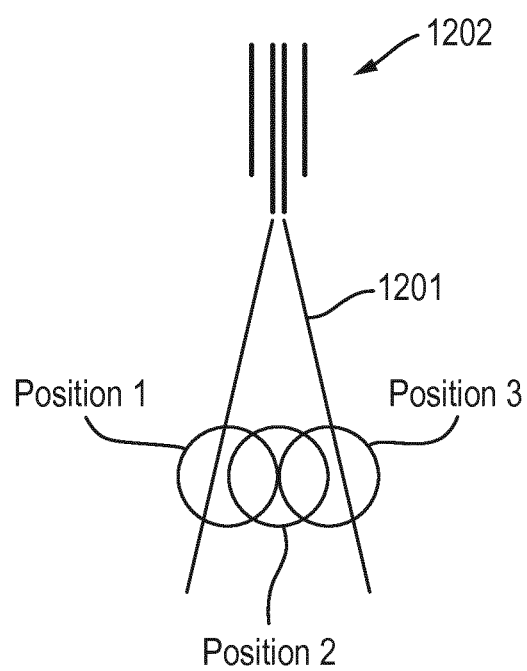
FIG. 12 shows an arrangement wherein the spray plumes from Meinhard nebulisers according to various embodiments and conventional metallic tube nebulisers were measured in three positions using a laser diffraction particle sizer system.

A series of measurements were made on a Malvern Spraytec® laser diffraction particle sizer system to determine the spray uniformity of Meinhard and standard metallic tube nebulisers. The spray plume 1201 from the nebulisers 1202 was measured in three positions, namely the left-hand side, the centre and the right-hand side of the spray, as shown in the schematic of FIG. 12. The laser diffraction particle sizer system uses a wide beam laser (Ø 10 mm) and the spray was sampled at an axial distance of approximately 20 mm from the spray tip. The liquid used in the tests was water and was pumped at a flow rate of 1 mL/min.

Figure 13A:
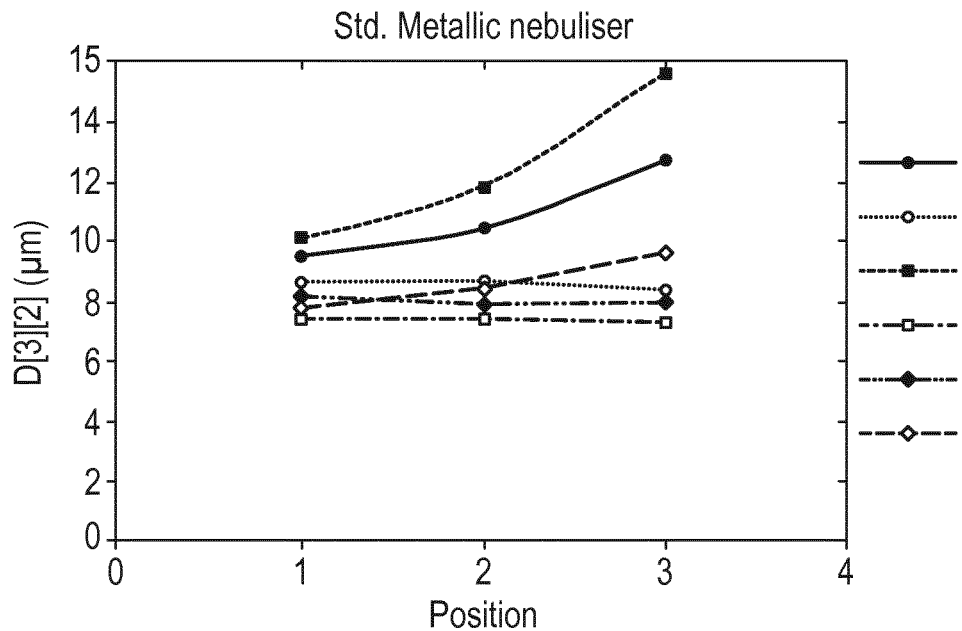
FIG. 13A shows the variation in spray uniformity obtained with a conventional pneumatic nebuliser and FIG. 13B shows the corresponding variation in spray uniformity obtained using six different Meinhard glass nebulisers according to various embodiments.
Figure 13B:
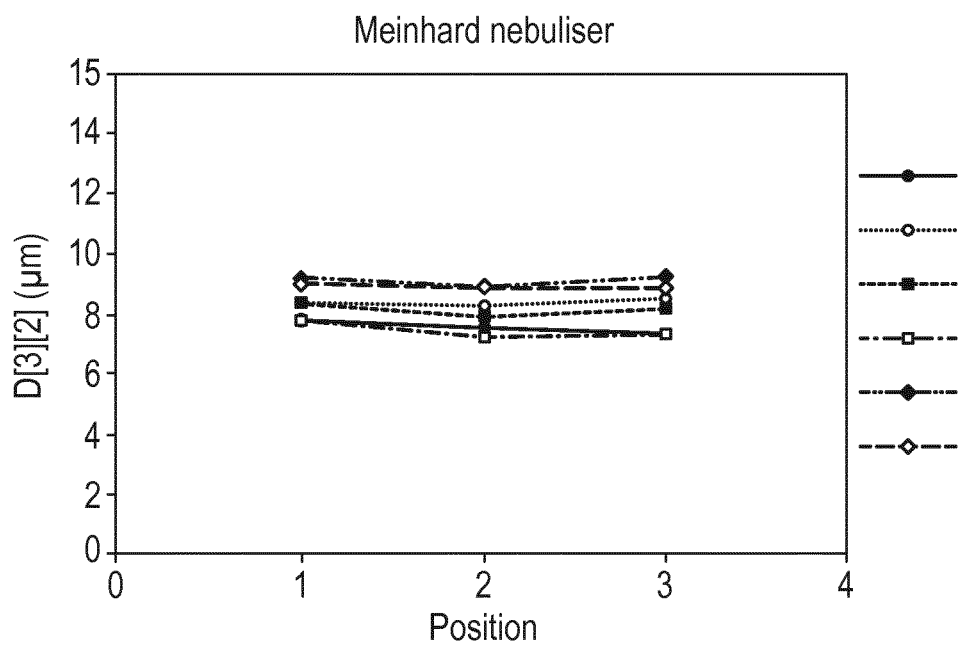

FIG. 13A shows the variation in spray uniformity obtained with a standard pneumatic nebuliser composed of a central liquid capillary (130 µm i.d., 230 µm o.d.) and an outer, high pressure nitrogen capillary (330 µm i.d.). The six plots shown in FIG. 13A correspond to data obtained with a single gas capillary and six different liquid capillaries. Three of the nebuliser configurations gave rise to uniform droplet diameters (Sauter mean diameter, D[3][2]) across the spray plume 1201 whilst three nebulisers showed significant non-uniformity in droplet size from the left-hand side to the right-hand side of the spray. A close inspection revealed that this non-uniformity was related to poor concentricity between the capillaries that gave rise to variations in gas flow from one side to the nebuliser to the other. FIG. 13B shows the droplet uniformity obtained for six different Meinhard glass nebulisers according to various embodiments. In contrast to the conventional metallic nebulisers, all the Meinhard nebulisers (which were of unitary construction in accordance with various embodiments) were observed to give a uniform droplet size across the spray plume. A close inspection revealed that the Meinhard design achieves a high level of concentricity between capillaries due to flexing of the inner capillary as the gas flow reaches an equilibrium.

Although the present invention has been described with reference to certain embodiments, it will be understood by those skilled in the art that various changes in form and detail may be made without departing from the scope of the invention as set forth in the accompanying claims.

The invention claimed is:

1. An impactor spray or electrospray ionisation ion source comprising:
   a nebuliser having a first conduit for providing a liquid sample and a second conduit for providing a nebulisation gas in order to nebulise the liquid sample, wherein the first conduit and second conduit are of unitary construction with each other, and wherein the outlet of the second conduit surrounds or circumferentially encloses a single first conduit; and
   one or more ring electrodes for providing charge to the sample and/or for removing charge from the nebuliser, wherein the one or more ring electrodes are provided around the second conduit and surround a single second conduit.

2. An ion source as claimed in claim 1, wherein an outlet of the first conduit has a substantially circular cross-sectional profile and/or an outlet of the second conduit has a substantially circular cross-sectional profile.

3. An ion source as claimed in claim 1, wherein outlets of the first conduit and second conduit are substantially concentric and coterminous.

4. An ion source as claimed in claim 1, wherein the first conduit and second conduit are unitarily formed of a blown material.

5. An ion source as claimed in claim 1, wherein the first conduit and second conduit are unitarily formed of a moulded material.

6. An ion source as claimed in claim 1, wherein the first conduit and second conduit are unitarily formed of glass.

7. An ion source as claimed in claim 1, wherein the first conduit and second conduit are unitarily formed of a ceramic, plastics or polymer material.

8. An ion source as claimed in claim 1, wherein the first conduit and second conduit are unitarily formed of a substantially non-metallic and/or substantially non-ferrous and/or substantially non-conductive material.

9. An ion source as claimed in claim 1, further comprising a liner conduit within the first conduit, wherein the liner conduit has a substantially uniform diameter and/or a more uniform diameter than the first conduit.

10. An ion source as claimed in claim 1, further comprising one or more connectors for fluidly connecting the ion source to a liquid sample source.

11. An ion source as claimed in claim 10, wherein the one or more connectors comprise one or more Zero Dead Volume (ZDV) connectors.

12. An ion source as claimed in claim 1, comprising one or more wire electrodes provided within the first conduit.

13. An ion source as claimed in claim 1, comprising one or more electrodes that comprise or form part of one or more connectors for fluidly connecting the ion source to a liquid sample source.

14. A mass and/or ion mobility spectrometer comprising an ion source as claimed in claim 1.

15. An ion source as claimed in claim 1, wherein the one or more ring electrodes are concentric with the first conduit and/or second conduit.

16. An ion source as claimed in claim 1, wherein the one or more ring electrodes are configured to provide charge to the sample without making contact with the sample.

17. An ion source as claimed in claim 1, wherein the one or more ring electrodes are in contact with an external side surface of the second conduit.

18. An impactor spray, impact or electrospray ionisation ion source comprising:
   a nebuliser having a first conduit for providing a liquid sample and a second conduit for providing a nebulisation gas in order to nebulise the liquid sample, wherein:
   outlets of the first conduit and the second conduit are substantially concentric and have substantially circular cross-sectional profiles at the exit region of the first and second conduits;
   the outlet of the second conduit surrounds or circumferentially encloses a single first conduit;
   the first conduit and the second conduit are of unitary construction with each other and are formed of glass; and
   one or more ring electrodes for providing charge to the sample and/or for removing charge from the nebuliser, wherein the one or more ring electrodes are provided around the second conduit and surround a single second conduit.

19. A method of impactor spray or electrospray ionisation comprising:
   providing a liquid sample through a first conduit of a nebuliser and providing a nebulisation gas through a second conduit of the nebuliser in order to nebulise the liquid sample, wherein the first conduit and second conduit are of unitary construction with each other, and wherein the outlet of the second conduit surrounds or circumferentially encloses a single first conduit; and
   providing one or more ring electrodes for providing charge to the sample and/or for removing charge from the nebuliser, wherein the one or more ring electrodes are provided around the second conduit and surround a single second conduit.

20. A method of mass and/or ion mobility spectrometry comprising a method of impactor spray or electrospray ionisation as claimed in claim 19.

* * * * *